Figure 1:
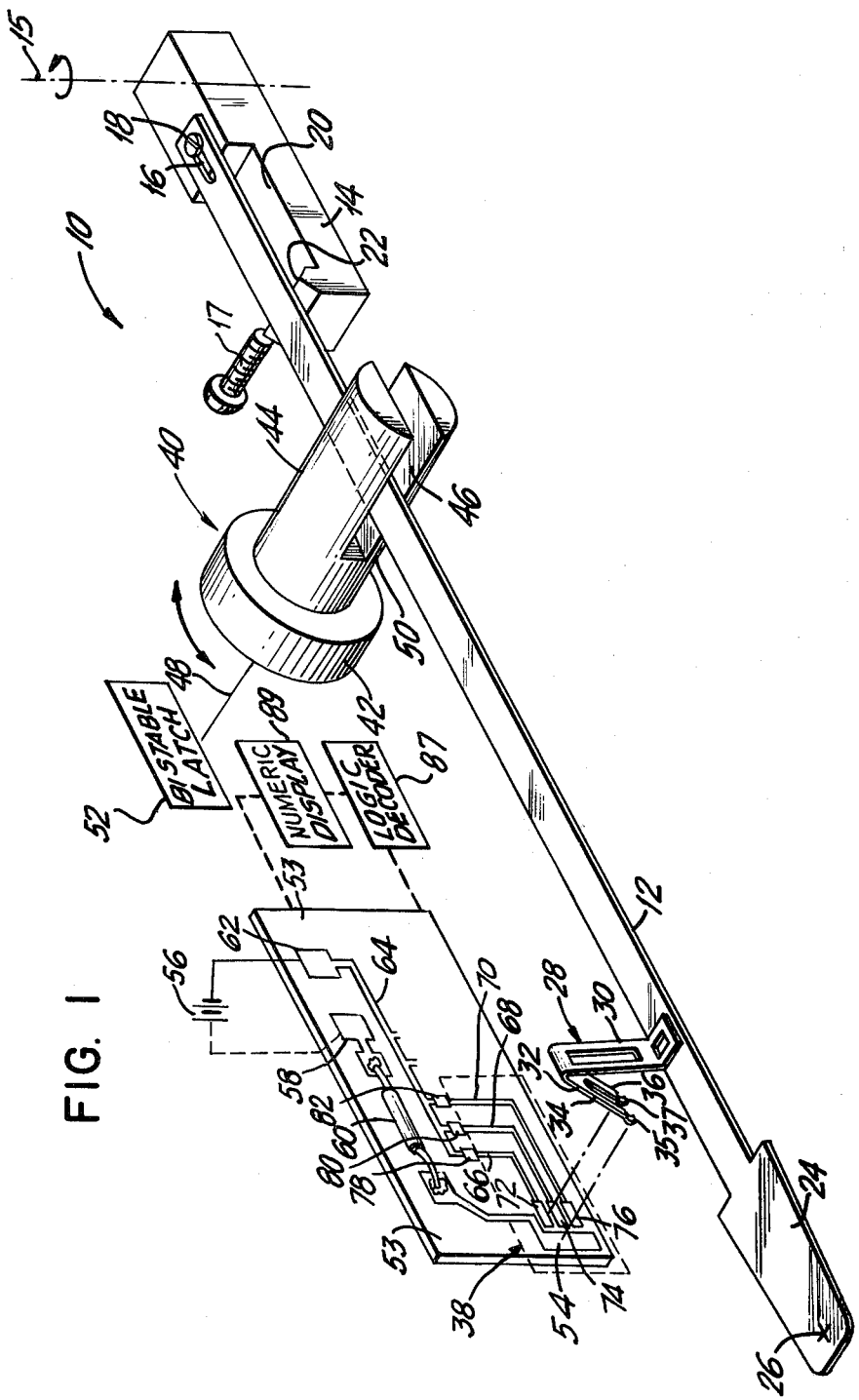

United States Patent [19]

Kurtin et al.

[11] 4,395,920
[45] Aug. 2, 1983

[54] DIGITAL STYLUS FORCE GAUGE

[75] Inventors: Stephen L. Kurtin, Sherman Oaks; Donald R. Chivens, Northridge, both of Calif.

[73] Assignee: Audio Dynamics Corporation, New Milford, Conn.

[21] Appl. No.: 224,804

[22] Filed: Jan. 13, 1981

[51] Int. Cl.³ .............................................. G01L 1/04
[52] U.S. Cl. .............................. 73/862.64; 73/862.52
[58] Field of Search ........... 73/862.52, 862.53, 862.14, 73/379, 380; 177/169, 177, 210 R, 229; 200/261, 263, 292; 340/665, 666, 678, 686

[56] References Cited

U.S. PATENT DOCUMENTS

| 991,661 | 5/1911 | Steen | 200/261 X |
|---|---|---|---|
| 1,322,625 | 7/1917 | Taylor | 200/263 |
| 1,861,012 | 5/1932 | Hornbeck et al. | 73/379 |
| 2,210,759 | 8/1940 | Hansen | 73/862.57 X |
| 2,377,869 | 6/1945 | Elliott | 73/862.64 X |
| 2,434,138 | 1/1948 | Adams | 73/862.64 X |
| 2,526,495 | 10/1950 | Meyer | 73/380 |
| 3,146,328 | 8/1964 | Mason et al. | 200/263 |
| 3,226,521 | 12/1965 | Motegi | 200/261 X |
| 3,520,183 | 7/1970 | Krizik | 73/862.52 |

Primary Examiner—Charles A. Ruehl
Attorney, Agent, or Firm—Hopgood, Calimafde, Kalil, Blaustein & Judlowe

[57] ABSTRACT

A device for measuring small units of force or weight, such as the tracking force of a phonograph cartridge, includes an elastic flexure member having an electric contact for engagement with an encoder. As the flexure member is deflected by an amount proportional to the force being measured, contacts on the encoder are sequentially activated to provide an electric signal used to drive on analog, digital or numeric visual display or readout of the measured force. The device of the invention may also include a mechanism for providing a second point of support for the flexure member and a second visual scale to provide a greater range of measurement.

17 Claims, 2 Drawing Figures

DIGITAL STYLUS FORCE GAUGE

BACKGROUND OF THE INVENTION

The present invention relates generally to force measuring devices, and more specifically to an improved device for measuring and providing an accurate readout of the tracking force of the stylus of a phonograph cartridge.

A phonograph cartridge contains a stylus which generally tracks the grooves of a record with a force of approximately 0.5 to 4 grams measured at the stylus tip. It is important that the stylus tracking force be determined and accurately established, since either too high or too low a stylus tracking force may cause damage to the record grooves and result in an audible degradation of the sound produced in the reproduction process. When such damage occurs to the record, it is irreversible.

Over the years a number of different devices have been proposed and used to measure the tracking force of a phonograph stylus. These devices have generally utilized a beam balance arrangement in which the phonograph stylus is placed at one end of a pivotable bar and a sliding weight is moved on a calibrated scale at the other end until the bar is balanced. These devices have suffered from a relative difficulty of use, including a difficulty in reading the often small indication of the measured force. Certain of these devices suffer from inaccuracy and a lack of repeatable measurements of the stylus force. Furthermore, the operation of certain of the prior devices may cause the user to damage the stylus by its being dropped during the measurement operation.

The present invention provides an improved stylus force gauge that is simple to use, and which provides an indication that can be clearly read and understood by the user. The stylus is placed on the tip of a measuring flexure extending from the body of the device and an illuminated discrete, digital or numeric display can be thereupon directly read to indicate the tracking force of the stylus. Thereafter the user may adjust the tone arm to achieve the optimum desired tracking force. The stylus force gauge of the invention provides for first and second scales of measurements to cover two, possibly overlapping force ranges. No balancing, calibration or other adjustments need be made by the user to employ or read the device.

It is accordingly an object of this invention to provide an improved force measurement device in which an analog, numeric or digital display of the measured force is provided.

It is another object of this invention to provide a force measurement device which is particularly suitable for use as a phonograph stylus tracking force gauge.

It is another object of this invention to provide a force gauge that does not require user adjustment.

It is another object of this invention to provide a force gauge of the type described having two separate measurement scales and which is easily switched between the two scales.

It is another object of this invention to provide a force gauge that minimizes the possibility that the user will damage the item whose force is to be measured.

It is a further object of the invention to provide a force measuring gauge in which a relatively small deflection of a force-sensing member is directly converted to easily readable form.

To these ends the present invention provides a device for measuring small forces such as tracking force of a phonograph cartridge or stylus. The device includes an elastic flexure member having an electric contact for engagement with an encoder. As the flexure member is deflected by an amount proportional to the force being measured, various contacts on the encoder are activated to provide discrete electrical signals. The signals are then used to drive a discrete visual display of the measured force. The display may be analog, numeric or digital and the reading of the display is directly related to the deflection of the flexure member. The device may also include a mechanism for providing a second point of deflection for the flexure member and a second visual scale to provide either greater precision or a greater range of measurement.

Figure 2:
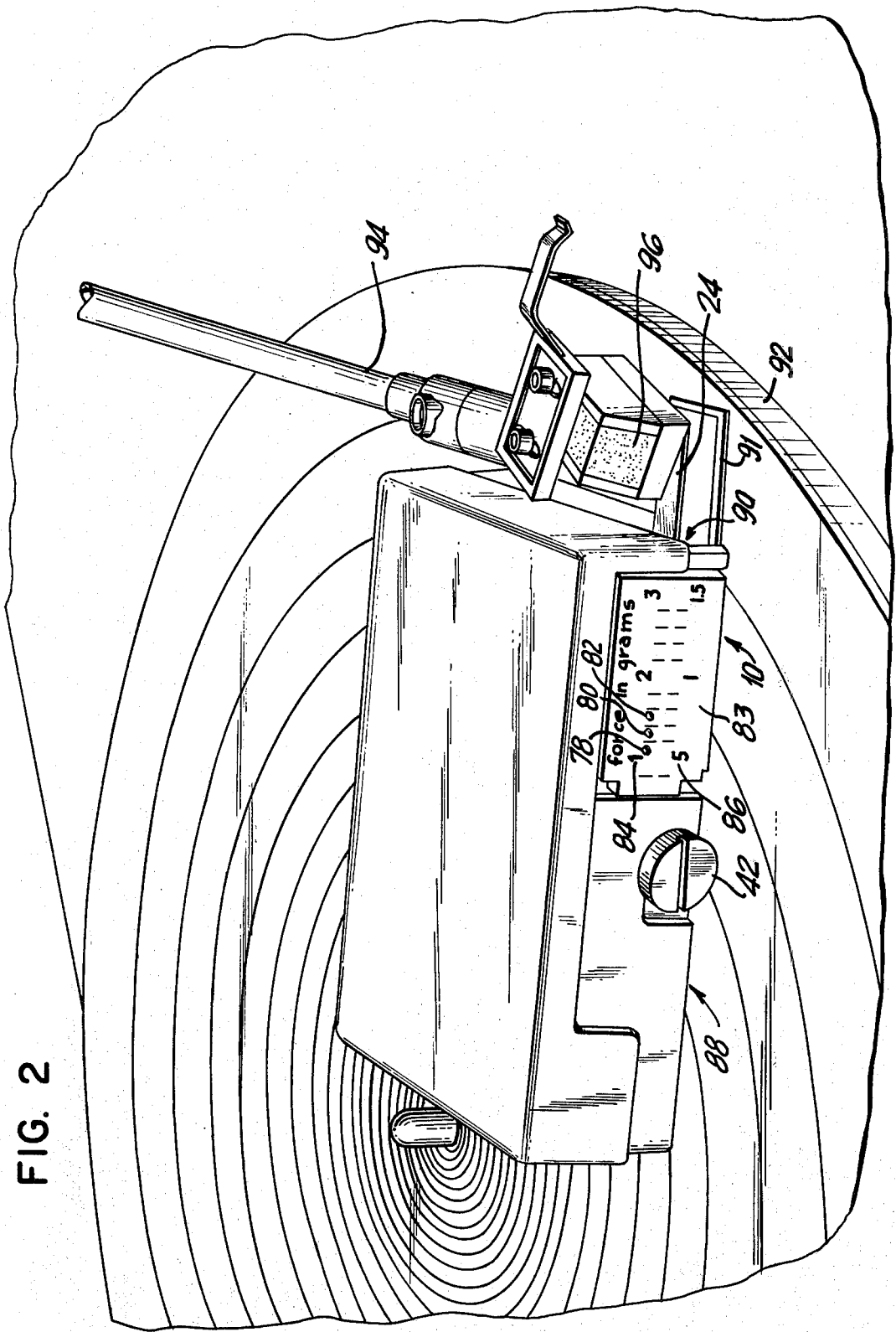

To the accomplishment of the above and such other objects as may hereinafter appear, the present invention relates to a stylus force gauge as set forth in the appended claims, as described in the following specification in conjunction with the accompanying drawings in which:

FIG. 1 is a simplified perspective internal view of the improved stylus force gauge constructed in accordance with the instant invention; and FIG. 2 is an elevational view of the measuring scale used in conjunction with the gauge of the invention.

The stylus force gauge 10 of the invention, as shown in the drawings, includes a flexure member, here shown as a precision leaf spring 12, fixed at one end to a mounting block 14. Other spring arrangements such as a coil spring and a non-flexible arm could be used in place of the planar spring illustrated herein. Flexure member 12 has an elongated slot 16 through which a screw 18 or other fastening member is inserted for mounting to block 14. Slot 16 permits the calibration adjustment for the spring rate of flexure member 12. Mounting block 14 includes a recessed portion 20 spaced away from flexure member 12 and a knife edge 22 about which flexure member 12 deflects. Tip 24 of flexure member 12 includes a locating mark 26 or depression for positioning the stylus of a phonograph cartridge for measurement purposes.

Proximate to tip 24 on flexure member 12 is a conductive wiper 28 which includes an upstanding portion 30 and a depending portion 32 including contact arms 34 and 36 for engagement with the contacts of an encoder 38. Contact arms 34, 36 include curved ends 35, 37 for positive contact with encoder 38. The conductive material of wiper 28 and encoder 38 are selected so that reliable contact is achieved with minimal friction thereby assuring that the accuracy of measurement is not appreciably affected by contact friction.

In order to assure minimum friction between wiper 28 and encoder 38 it is preferable that the contacts of wiper 28 and the contacts of encoder 38 be formed of dissimilar metals. Suitable metals include noble metals such as gold or platinum for the contacts of encoder 38 and refractory, relatively harder, metals such as rhodium or rhenium for the contacts of wiper 28. Since the gauge is designed to measure forces of tenths of grams, to prevent appreciable hysteresis errors it is necesary that the friction forces between the contacts of wiper 28 and encoder 38 be kept to a few hundredths of a gram. In order to set the minimal contact force necessary to ensure accurate results, the rear of mounting block 14 is pivotable about an axis 15 and an adjustment screw 17 abuts flexure mounting block 14 to vary the distance of flexure 12 from encoder 38. Screw 17 is adjusted so that curved ends 35, 37 of contact arms 34, 36 just touch the contacts of encoder 38.

In order to provide a second scale of measurement for the device, a second point of support for flexure member 12 is provided. This second point is provided by a selector assembly 40, which includes a selector knob 42 with a cylindrical extension 44 including an elongated slot 46 through which the flexure member 12 extends. Selector assembly 40 is pivotable along its longitudinal axis 48 from a first position, in which flexure member 12 is completely out of contact with an edge 50 of slot 46, to a second position in which edge 50 of slot 46 contacts flexure member 12 to provide an alternative support point. Due to the face that the effective length of flexure member 12 is shortened when it is in contact with edge 50, a different scale factor is obtained in the measurements. A bistable magnetic latch 52 serves to hold adjustment member 40 in either its first or second position until it is manually turned.

Encoder 38 includes a non-conductive substrate 53 having a number of conductive contacts disposed thereon for engagement with contact ends 35 and 37 of wiper 28. A first conductive contact 54 is oriented generally vertically in the direction of deflection of flexure member 12 so that end 35 of contact arm 34 will be in engagement with it at all times. A voltage source such as a battery 56 is connected to a terminal 58 on substrate 53 and to contact 54 through an appropriate current limiting resistor 60.

The other pole of battery 56 is coupled to a terminal 62 on substrate 53. A lead 64 is connected to terminal 62, and a plurality of branches, only three of which, namely branches 66, 68, 70, are illustrated for the sake of clarity, extend from lead 64. It is to be understood, however, that as many additional branches as may be required can be added. The larger the number of branches, the greater is the number of discrete forces that may be indicated. Branches 66, 68, 70 respectively, include contacts 72, 74, 76 for contact with the end 37 of contact arm 36 of wiper 28 as flexure member 12 moves.

Visual indicia such as light-emitting diodes (LED's) 78, 80, 82 are respectively connected in series with branches 66, 68, 70. Thus, when arm 36 of wiper 28 is engaged with contact 72 and arm 34 is in contact with contact 54, LED 78 will be illuminated. Similarly the engagement of arm 36 and contact 74 will illuminate LED 80 and the engagement of arm 36 and contact 76 will illuminate LED 82. Thus, as flexure member 12 is displaced, such that the deflection of the wiper is directly converted to the force readout, various ones of the LED's will be illuminated.

LED's 78, 80, 82 are preferably mounted to the rear of substrate 53 and, as shown in FIG. 2, are arranged behind a translucent screen 83 having a first scale 86 and a second scale 84.

Substrate 53 has all the contacts, wiring and indicators mounted to it which greatly facilitates assembly and repair of the device. Furthermore, screen 83 may also be mounted to substrate 53.

Scale 84 is used when selector assembly 40 is in its second position and edge 50 is contacting flexure arm 12 to shorten its effective length and thus increase the amount of force required for a given deflection of flexure arm 12. Scale 86 is used when selector assembly 40 is in its first position and edge 50 thereof is out of contact with flexure arm 12. In place of the "bar graph" type of display illustrated in FIG. 2, a "numeric" display could be obtained by having the LED's read out the force in a series of discrete digits illuminated by LED's. Alternatively the output of encoder 38 may be supplied to a logic decoder 87 and thereafter to a digital display 89 of, for example, conventional 7-segment type. The display may be made up of LEDs, LCDs, fluorescent or other well known displays. The plurality of discrete electrical signals provided by encoder 38 corresponding to the force applied to flexure arm 12 may thus be used to drive different types of displays, both analog and digital.

A preferred enclosure 88 for force gauge 10, as illustrated in FIG. 2, is generally rectangular and includes an opening 90 through which tip 24 of flexure 12 extends and an extension 91 which provides flexure 12 with protection from sideways blows. As illustrated, enclosure 88 is designed to rest on the turntable 92. The user positions the tone arm 94 so that the stylus of cartridge 96 rests on positioning mark 26, and the tracking force may then be read directly from the LED display through screen 83. Turning selector knob 42 permits the selection of either scale 84 or scale 86. These scales have some overlap in their measurement range to permit the user to select the most appropriate scale.

The size and spacing of contacts 72, 74, 76 are arranged so that if end 37 of contact arm 36 is midway between two contacts (i.e., contacts 72, 74 or contacts 74,76) it will simultaneously engage both of the contacts. The illumination of two LED's will indicate that the force reading is between the points indicated. Thus, the resolvable precision of measurement exceeds the number of discrete contacts in the encoder. The spacing between contacts 72, 74, 76 may be equal or non-equal. If this spacing is equal, the spacing of the LED's in the corresponding bar graph display should preferably be equal; if the spacing is non-equal, the spacing of the LED's should preferably also be non-equal. Thus, the spacing between the LED's 78, 80, 82 should preferably be directly proportional to the spacing between contacts 72, 74 and 76.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A gauge for measuring a force comprising:
   a plurality of spaced electrical contacts;
   a leaf spring to which said force is applied, said leaf spring being fixedly mounted at one end to a fixed mounting means that provides a first point of support for said leaf spring;
   an electrically conductive wiper attached to said leaf spring so that when said leaf spring is deflected by said force said wiper engages said electrical contacts sequentially;
   means for providing a second point of support for said leaf spring to thereby provide first and second scale factors on said spring;
   bistable magnetic latch means for selectively locking said second point of support;
   a plurality of spaced indicators; and circuit means for energizing said indicators and for coupling each one of said indicators to a different one of said contacts so that as said leaf spring is deflected said indicators will be energized sequentially.

2. The gauge as claimed in claim 1, wherein said plurality of indicators are sequentially arranged, the spacing of said indicators being directly proportional to the spacing of said electrical contacts.

3. The gauge as claimed in claim 1 wherein said means for providing a second point of support includes a deflection edge displaceable from a first position out of engagement with said leaf spring to a second position in engagement with said leaf spring, whereby said leaf spring is selectively deflectable along said edge or about said first point of support.

4. The gauge as claimed in claim 1, wherein said wiper engages at least one of said spaced contacts, but not more than two of said contacts at any position.

5. A displacement indicator which comprises:
a plurality of spaced contacts;
a wiper;
a cantilever leaf spring having opposed ends, one end of which being fixedly mounted, said wiper being mounted to the other end of said leaf spring;
means for adjusting the contact friction between said wiper and said spaced contacts;
means for displacing said wiper and causing said wiper to engage said contacts sequentially;
a plurality of indicators spaced from one another in accordance with the spacing between said contacts; and
circuit means operatively connected to said indicators and contacts for energizing said indicators and for coupling said indicators to different ones of said contacts, whereby as said wiper is displaced said indicators are energized sequentially, the position of any one of said energized indicators being a function of the displacement of said wiper from a reference point.

6. The displacement indicator as claimed in claim 5, wherein said contacts are spaced by a substantially uniform distance.

7. The displacement indicator as claimed in claim 5, wherein the spacing of said contacts is directly proportional to the spacing of said indicators.

8. The displacement indicator as claimed in claim 5, further including a substrate, said contacts and said indicators being mounted on said substrate.

9. The displacement indicator as claimed in claim 5, wherein said wiper is constructed and arranged so that it engages at least one but not more than two of said contacts at any position thereof.

10. A force gauge which comprises:
a plurality of spaced contacts;
a cantilever leaf spring fixedly mounted at one end to form a first point of support;
a wiper attached to the other end of said leaf spring such that as said spring is deflected said wiper brushes said contacts sequentially;
means for adjusting the contact friction between said wiper and said spaced contacts;
means for applying force to said leaf spring;
a plurality of spaced indicators, the spacing of said indicators being a function of the spacing of said contacts; and
circuit means for energizing said indicators and for coupling each one of said indicators to a different one of said contacts whereby as said leaf spring is deflected said indicators will be energized sequentially.

11. The force gauge as claimed in claim 10, wherein said gauge includes means for providing a second point of support for said leaf spring to thereby provide first and second scale factors on said spring.

12. The force gauge as claimed in claim 11, wherein said gauge includes bistable magnetic latch means for locking said first and second point of support.

13. The force gauge as claimed in claim 10, wherein said contact friction adjustment means comprise means for displacing said wiper along a line perpendicular to the plane of said contacts.

14. The force gauge as claimed in claim 10, wherein said wiper and said contacts comprise dissimilar metals.

15. The force gauge as claimed in claim 10, wherein said wiper comprises a refractory metal and said contacts comprise a noble metal.

16. A force gauge which comprises:
a plurality of spaced contacts;
a cantilever leaf spring fixedly mounted at one end;
a wiper attached to said leaf spring such that as said leaf spring is deflected said wiper brushes said contacts sequentially;
said wiper and said contacts comprising dissimilar metals;
means for applying force to said leaf spring;
a plurality of indicators;
circuit means for energizing said indicators and for coupling each one of said indicators to a different one of said contacts whereby as said leaf spring is deflected said indicators will be energized sequentially; and
means for labeling each of said indicators with a numeral, the numeral associated with each indicators being a function of the force required to be applied to said leaf spring in order to energize said indicator.

17. A force gauge which comprises:
a plurality of spaced contacts;
a cantilever leaf spring fixedly mounted at one end;
a wiper attached to said leaf spring such that as said leaf spring is deflected said wiper brushes said contacts sequentially;
said wiper comprises a refractory hard metal and said contacts comprise a noble metal;
means for applying force to said leaf spring; and
decoding and display means coupled to said wiper and said contacts whereby a digital representation of force applied to said spring will be displayed.

* * * * *